(12) United States Patent
Flendrig et al.

(10) Patent No.: US 10,752,863 B2
(45) Date of Patent: Aug. 25, 2020

(54) CLEANING COMPOSITION

(71) Applicant: Conopco, Inc., Englewood Cliffs, NJ (US)

(72) Inventors: Leonardus Marcus Flendrig, Amsterdam (NL); Gerrit Jan Willem Goudappel, Hellevoetsluis (NL); Anke Kuijk, Eerbeek (NL); Stephanie Lam, Gaithersburg, MD (US); Sandra Joyce Veen, Amersfoort (NL); Orlin Dimitrov Velev, Cary, NC (US); Krassimir Petkov Velikov, Utrecht (NL); Jan Adrianus Verheij, Schiedam (NL)

(73) Assignee: Conopco Inc., Englewood Cliffs, NJ (US)

(*) Notice: Subject to any disclaimer, the term of this patent is extended or adjusted under 35 U.S.C. 154(b) by 0 days.

(21) Appl. No.: 15/539,897

(22) PCT Filed: Dec. 22, 2015

(86) PCT No.: PCT/EP2015/081008
§ 371 (c)(1),
(2) Date: Jun. 26, 2017

(87) PCT Pub. No.: WO2016/107793
PCT Pub. Date: Jul. 7, 2016

(65) Prior Publication Data
US 2018/0002638 A1 Jan. 4, 2018

(30) Foreign Application Priority Data

Dec. 31, 2014 (EP) ..................................... 14200701

(51) Int. Cl.
| | | |
|---|---|---|
| *C11D 3/00* | (2006.01) | |
| *C11D 11/00* | (2006.01) | |
| *C11D 3/382* | (2006.01) | |
| *G10K 11/00* | (2006.01) | |
| *H04R 1/08* | (2006.01) | |
| *B32B 3/26* | (2006.01) | |
| *B32B 27/36* | (2006.01) | |
| *C08J 9/00* | (2006.01) | |

(52) U.S. Cl.
CPC ............ *C11D 3/0094* (2013.01); *C11D 3/382* (2013.01); *C11D 11/0094* (2013.01); *B32B 3/266* (2013.01); *B32B 27/36* (2013.01); *B32B 2307/10* (2013.01); *C08J 9/00* (2013.01); *G10K 11/002* (2013.01); *H04R 1/086* (2013.01)

(58) Field of Classification Search
None
See application file for complete search history.

(56) References Cited

U.S. PATENT DOCUMENTS

| | | |
|---|---|---|
| 5,998,349 A | 12/1999 | Guillou |
| 6,241,812 B1 | 6/2001 | Smith |
| 10,328,005 B2 | 6/2019 | Carnali et al. |
| 2003/0024556 A1 | 2/2003 | Guiramand et al. |
| 2008/0108714 A1 | 5/2008 | Swazey |
| 2013/0123374 A1* | 5/2013 | Gusek .................. A23D 7/0053 514/781 |
| 2014/0031305 A1 | 1/2014 | Terrisse et al. |
| 2014/0378362 A1 | 12/2014 | Cooke et al. |
| 2015/0159120 A1* | 6/2015 | Fernandez-Prieto ....................... C12Y 402/0200 435/204 |
| 2016/0145805 A1* | 5/2016 | Kroener ................. D21B 1/066 162/4 |
| 2018/0002638 A1 | 1/2018 | Flendrig et al. |

FOREIGN PATENT DOCUMENTS

| | | |
|---|---|---|
| CN | 101331218 A | 12/2008 |
| EP | 2196186 B1 | 6/2010 |
| EP | 2603196 B1 | 6/2013 |
| WO | WO2012019934 A2 | 2/2012 |
| WO | WO2012052306 | 4/2012 |
| WO | WO2013160022 | 10/2013 |
| WO | WO2013160024 | 10/2013 |
| WO | WO2013160024 A1 | 10/2013 |
| WO | WO2014017913 | 1/2014 |
| WO | WO2014082951 | 6/2014 |
| WO | WO2014142651 | 9/2014 |
| WO | WO2015006634 A1 | 1/2015 |
| WO | WO2016079007 A1 | 5/2016 |

(Continued)

OTHER PUBLICATIONS

IPRP2 in PCTEP2015081008, May 16, 2017 (NPL, pp. 1-18).

(Continued)

*Primary Examiner* — Tanisha Diggs
(74) *Attorney, Agent, or Firm* — N.V. Nederlandsch Octrooibureau; Catherine A. Shultz; Tamara C. Stegmann

(57) ABSTRACT

The present invention is in the field of cleaning compositions. In particular it relates to liquid, gelled or pasty cleaning compositions comprising one or more detergent surfactants. The invention provides cleaning compositions comprising water, one or more detergent surfactants and defibrillated primary cell wall material comprising microfibrils. The invention also relates to a method for preparing a cleaning composition comprising water, one or more detergent surfactants and defibrillated primary cell wall material comprising microfibrils, wherein the method includes a high shear treatment step.

12 Claims, 1 Drawing Sheet

(56) References Cited

FOREIGN PATENT DOCUMENTS

WO    WO2016107793 A1    7/2016

OTHER PUBLICATIONS

Search Report and Written Opinion in PCTEP2015081008, dated Mar. 9, 2015 (NPL, pp. 19-31).
Search Report and Written Opinion in EP14200701, dated Jun. 18, 2015 (NPL, pp. 32-40).
Written Opinion 2 in PCTEP2015081008, dated Dec. 20, 2016 (NPL, pp. 41-48).
Bird K, Fiberstar to launch emulsifier alternative for personal care at in-cosmetics, Mar. 16, 2010—Cosmetic design.com.

* cited by examiner

CLEANING COMPOSITION

FIELD OF THE INVENTION

The present invention relates to a cleaning composition. In particular, the invention relates to a cleaning composition comprising detergent surfactant and defibrillated primary cell wall material comprising microfibrils. The invention also provides a method for preparing a cleaning composition and a composition obtainable by that method.

BACKGROUND TO THE INVENTION

Cleaning compositions comprising detergent surfactants are well-known in many fields of application, for instance for hard surface cleaning, dishwashing, laundry washing, skin care, scalp and hair care, oral care. Most surfactant compositions have a tendency to foam, in particular once they are diluted upon application. In many such applications, especially where consumers prepares suds or lathers from the cleaning composition themselves, such foaming is perceived as a sign of detergency. Often it is even perceived as a prerequisite for detergency. Therefore, good foam formation is a very desirable characteristic for many cleaning compositions. It is especially desirable that the foamy or frothy layer, once formed, does not disappear readily but remains in place for the consumer to be observed. However, optimising a formulation to provide such optimal foaming may negatively affect other characteristics. In particular, a well-known way to enhance foaming is by using a larger quantity of surfactant present in a formulation. From a sustainability point of view, this is very undesirable. Therefore, it would be desirable to provide an alternative way of enhancing the stability of the foam formed from cleaning compositions.

WO 2014/142651 discloses use of particulate cellulose material (for instance from sugar beet pulp) for keeping gas bubbles suspended in a fluid water-based composition. The cellulose particles have a volume-weighted median major dimension within the range of 25-75 µm, as measured by laser light diffractometry and should not be defibrillated. Similarly, WO 2014/017913 discloses a liquid detergent product comprising the same type of non-defibrillated particulate cellulose material.

WO 2012/52306 relates to externally structured aqueous liquid detergent compositions, in which non-defibrillated citrus fibre is used to suspend particulates. WO 2013/160024 and WO 2013/160022 relate to similar compositions in which the tendency of activated citrus fibre to form visible residues on the wall of a container is overcome by the addition of polyacrylates and water-swellable clay, respectively. WO 2014/82951 discloses a dentifrice comprising calcium carbonate particles and non-defibrillated citrus fibre to improve the cleaning efficacy of those particles.

US 2008/0108714 discloses surfactant-thickened systems comprising microfibrous cellulose (bacterial cellulose) to improve the suspending properties of the system. It particularly discloses the combination of bacterial cellulose, xanthan gum and carboxymethyl cellulose is such systems.

U.S. Pat. No. 6,241,812 relates to sanitisers and disinfectants. It discloses the combination of reticulated bacterial cellulose with cationic surfactant and a co-agent (such as cationic hydroxyethyl cellulose, pregelatinized cationic starch, conventional cationic starch, cationic guar gum, gum tragacanth and chitosan) to prepare acid-stable cellulose fibre dispersions, with reduced precipitation and flocculation of the cellulose fibres.

U.S. Pat. No. 5,998,349 discloses descaling formulations comprising between 0.05 and 1.5 wt-% of cellulose microfibrils having at least 80% of cells with primary walls, a pH of less than or equal to 2 and at least one detergent surfactant. The cellulose fibre is used to provide a pseudo-plastic rheological profile, which is stable over time.

It is an object of the present invention to provide cleaning compositions that provide enhanced sensory properties to the consumer. Thus, it also is an object of the present invention to provide cleaning compositions providing enhanced foam stability, in particular without increasing the amount of detergent surfactants. Desirably, the enhanced foam stability is provided upon dilution of the cleaning composition when it is used. It is another object of the invention to provide such cleaning compositions that display enhanced foam stability, without negatively affecting other desirable properties of the composition, such as their detergent efficacy, their physical appearance and/or other sensory attributes. It is yet another object of the invention to provide cleaning compositions that have a reduced environmental impact, without affecting other desirable properties. It is a further object of the invention to provide a method for preparing such cleaning compositions.

DEFINITION OF THE INVENTION

We have found that one or more of these objects can be achieved by the cleaning composition of the present invention. In particular, it was surprisingly found that primary cell wall material comprising microfibrils, which has been defibrillated to a suitable level, such that the composition homogeneity parameter of the composition, the fibre defibrillation parameter of the primary cell wall material, or the fibre homogeneity parameter of the primary cell wall material has an appropriate value can be used to provide cleaning compositions that upon dilution display good foamability and longer-lasting foams.

Accordingly, in a first aspect the invention provides a cleaning composition, comprising
a. water
b. 0.01 to 70 wt-% of one or more detergent surfactants and
c. 0.1 to 4 wt-% of defibrillated primary cell wall material comprising microfibrils
wherein
the primary cell wall material is sourced from plant parenchymal tissue,
at least 80 wt % of the microfibrils is smaller than 50 nm in diameter; and
the cleaning composition has a composition homogeneity parameter CHP of at least 0.030.

Similarly, according to a second aspect, the invention provides a cleaning composition, comprising
a. water
b. 0.01 to 70 wt-% of one or more detergent surfactants and
c. 0.1 to 4 wt-% of defibrillated primary cell wall material comprising microfibrils
wherein
the primary cell wall material is sourced from plant parenchymal tissue,
at least 80 wt % of the microfibrils is smaller than 50 nm in diameter; and
the defibrillated primary cell wall material has a fibre homogeneity parameter FHP of at least 0.022.

Likewise, according to a third aspect, the invention provides a cleaning composition, comprising a. water
b. 0.01 to 70 wt-% of one or more detergent surfactants and
c. 0.1 to 4 wt-% of defibrillated primary cell wall material comprising microfibrils wherein
the primary cell wall material is sourced from plant parenchymal tissue,
at least 80 wt % of the microfibrils is smaller than 50 nm in diameter; and
the defibrillated primary cell wall material has a fibre defibrillation parameter FDP of at least 0.10 Hz.

The cleaning compositions of the present invention are typically in a liquid, gel or paste format.

Cleaning compositions featuring desirable properties including enhanced foam stability can suitably be prepared by methods including a high shear treatment step. Therefore, in a fourth aspect, the present invention provides a method for preparing a cleaning composition, wherein the cleaning composition comprises
a. water;
b. 0.01 to 70 wt-% of one or more detergent surfactants; and
c. 0.1 to 1 wt-% of defibrillated primary cell wall material comprising microfibrils;
and wherein
the primary cell wall material is sourced from plant parenchymal tissue,
at least 80 wt % of the microfibrils is smaller than 50 nm in diameter;
and wherein the method comprises the steps of
i. providing a source of primary cell wall material;
ii. dispersing the primary cell wall material in an aqueous phase, thereby to form an aqueous dispersion comprising between 0.1 and 1 wt-% of the primary cell wall material;
iii. treating the aqueous dispersion to obtain a dispersion comprising defibrillated primary cell wall material, whereby the treatment includes a high shear treatment step selected from high pressure homogenisation at a pressure of between 500 and 2000 bar and microfluidising at a pressure of between 500 and 2000 bar;
wherein other constituents of the cleaning composition are independently mixed into the aqueous phase before step ii, between steps ii and iii, after step iii.

Likewise, in a fifth aspect, the invention provides a method for preparing a cleaning composition, wherein the cleaning composition comprises
a. water;
b. 0.01 to 70 wt-% of one or more detergent surfactants; and
c. 0.1 to 4 wt-% of defibrillated primary cell wall material comprising microfibrils;
and wherein
the primary cell wall material is sourced from plant parenchymal tissue,
at least 80 wt % of the microfibrils is smaller than 50 nm in diameter;
and wherein the method comprises the steps of
i. providing a source of primary cell wall material;
ii. dispersing the primary cell wall material in an aqueous phase, thereby to form an aqueous dispersion comprising between 0.1 and 4 wt-% of the primary cell wall material;
iii. treating the aqueous dispersion to obtain a dispersion comprising defibrillated primary cell wall material, whereby the treatment includes one or more high shear treatment steps and wherein the treatment is such that the fibre defibrillation parameter FDP of the defibrillated primary cell wall material is at least 0.10 Hz or the fibre homogeneity parameter FHP of the defibrillated primary cell wall material is at least 0.022;

wherein other constituents of the cleaning composition are independently mixed into the aqueous phase before step ii, between steps ii and iii, or after step iii.

The methods according to the invention yield cleaning compositions displaying desirable properties, including the aforementioned enhanced foam stability. Therefore, according to a sixth aspect, the invention also provides a cleaning composition obtainable by the method according to the fourth and/or the fifth aspect of the invention.

According to a seventh aspect, the invention provides use of defibrillated cell wall material comprising microfibrils to increase the foam stability of a cleaning composition comprising water and 0.1 to 70 wt-% of one or more detergent surfactants, wherein the composition has a composition homogeneity parameter CHP of at least 0.030.

According to an eighth aspect, the invention provides use of defibrillated cell wall material comprising microfibrils to increase the foam stability of a cleaning composition comprising water and 0.1 to 70 wt-% of one or more detergent surfactants, wherein the composition has a fibre defibrillation parameter FDP of at least 0.010 Hz.

DETAILED DESCRIPTION OF THE INVENTION

Figure 1:
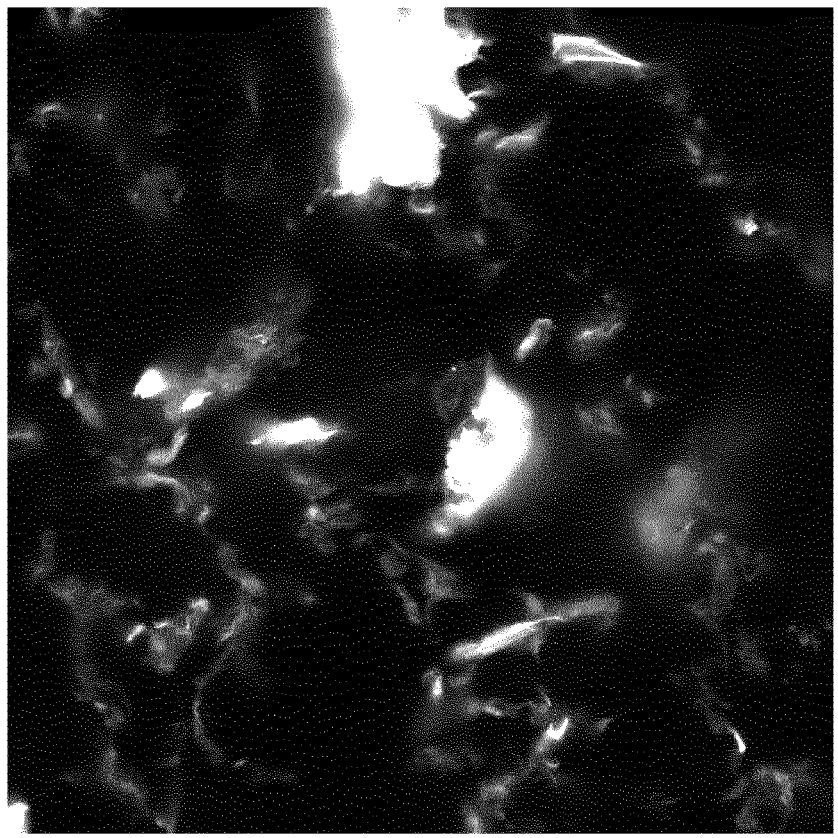
FIG. 1 shows a confocal scanning laser micrograph of Comparative Example A.

Any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient temperature is defined as a temperature of about 20 degrees Celsius.

Cleaning Composition

The cleaning composition according to any aspect of the invention is a composition intended to aid in cleaning, typically in a domestic environment. The cleaning composition preferably is in a liquid, gel or paste format, more preferably it is in a liquid format. Thus it is preferred that the cleaning composition according to the present invention is a liquid cleaning composition. The precise format and formulation of the composition can suitably be adapted to the intended type of application, as is generally known by the skilled person. For example, a preferred format would be a hand dishwash composition, or a hard surface cleaning composition. However, other types of cleaning compositions are also contemplated. The cleaning composition comprises water, one or more detergent surfactants and defibrillated primary cell wall material. In addition, the cleaning composition may suitably comprise other ingredients that are typical for such cleaning compositions. For example, the composition may also comprise non-detergent surfactants, preservatives, etcetera.

Surfactant

There are few limitations on the type or the amount of the detergent surfactants. The detergent surfactant may be one type of surfactant, or a mixture of two or more surfactants. Synthetic surfactants preferably form a major part of the one or more detergent surfactants. Thus, the one or more detergent surfactants are preferably selected from one or more of anionic surfactants, cationic surfactants, non-ionic surfactants, amphoteric surfactants and zwitterionic surfactants. More preferably, the one or more detergent surfactants are anionic, nonionic, or a combination of anionic and nonionic surfactants. Mixtures of synthetic anionic and nonionic surfactants, or a wholly anionic mixed surfactant system or admixtures of anionic surfactants, nonionic surfactants and amphoteric or zwitterionic surfactants may all be used according to the choice of the formulator for the required cleaning duty and the required dose of the cleaning composition.

In general, the surfactants may be chosen from the surfactants described in well-known textbooks like "Surface Active Agents" Vol. 1, by Schwartz & Perry, lnterscience 1949, Vol. 2 by Schwartz, Perry & Berch, lnterscience 1958, and/or the current edition of "McCutcheon's Emulsifiers and Detergents" published by Manufacturing Confectioners Company or in "Tenside-Taschenbuch", H. Stache, $2^{nd}$ Edn., Carl Hauser Verlag, 1981; "Handbook of Industrial Surfactants" (4th Edn.) by Michael Ash and Irene Ash; Synapse Information Resources, 2008.

The anionic surfactant may include soap (salt of fatty acid). A preferred soap is made by neutralisation of hydrogenated coconut fatty acid, for example Prifac® 5908 (ex Croda). Mixtures of saturated and unsaturated fatty acids may also be used.

Nonionic detergent surfactants are well-known in the art. A preferred nonionic surfactant is a C12-C18 ethoxylated alcohol, comprising 3 to 9 ethylene oxide units per molecule. More preferred are C12-C15 primary, linear ethoxylated alcohols with on average 5 to 9 ethylene oxide groups, more preferably on average 7 ethylene oxide groups.

Examples of suitable synthetic anionic surfactants include sodium lauryl sulphate, sodium lauryl ether sulphate, ammonium lauryl sulphosuccinate, ammonium lauryl sulphate, ammonium lauryl ether sulphate, sodium cocoyl isethionate, sodium lauroyl isethionate, and sodium N-lauryl sarcosinate. Mostly preferred the synthetic anionic surfactants comprise the synthetic anionic surfactant linear alkylbenzene sulphonate (LAS). Another synthetic anionic surfactant suitable in the present invention is sodium alcohol ethoxyether sulphate (SAES), preferably comprising high levels of sodium C12 alcohol ethoxy-ether sulphate (SLES). It is preferred for the composition to comprise LAS.

In some embodiments, the one or more detergent surfactants preferably comprises synthetic anionic with nonionic detergent active materials and optionally amphoteric surfactant, including amine oxide.

In other embodiments, it is preferred that the one or more detergent surfactants comprise two different anionic surfactants, preferably linear alkyl benzene sulphonate and a sulphate, for example LAS and SLES.

Synthetic anionic surfactants can be present, for example, in amounts in the range from about 5% to about 70 wt % of the one or more detergent surfactants.

The cleaning compositions may further comprise an amphoteric surfactant, wherein the amphoteric surfactant is present in a concentration of 1 to 20 wt %, preferably 2 to 15 wt % more preferably 3 to 12 wt % of the one or more surfactants. Typical examples of suitable amphoteric and zwitterionic surfactants are alkyl betaines, alkylamido betaines, amine oxides, aminopropionates, aminoglycinates, amphoteric imidazolinium compounds, alkyldimethylbetaines or alkyldipolyethoxybetaines.

The cleaning composition according to any aspect of the invention comprises 0.01 to 70 wt-% of one or more detergent surfactants. The cleaning composition preferably comprises at least 0.2 wt-%, more preferably at least 0.5 wt-%, even more preferably at least 1 wt-%, even more preferably at least 5 wt-%, still more preferably at least 10 wt-%, and yet more preferably at least 15 wt-% of the one or more detergent surfactants. The cleaning composition preferably comprises up to 60 wt-%, more preferably up to 50 wt-%, even more preferably up to 40 wt-%, still more preferably up to 35 wt-%, still more preferably up to 30 wt-% and yet more preferably up to 25 wt-% of the one or more detergent surfactants. Thus, the cleaning composition preferably comprises from 0.2 to 60 wt-%, more preferably from 0.5 to 50 wt-%, even more preferably from 1 to 40 wt-%, still more preferably from 5 to 35 wt-%, still more preferably from 10 to 30 wt-% and yet more preferably from 15 to 25 wt-5 of the one or more surfactants.

Primary Cell Wall Material

For the purpose of the invention "primary cell wall material" is defined as the cell wall material from which essentially all cold water soluble components have been removed, i.e. at a temperature of around 20 degrees Celsius. This can easily be achieved by washing with water.

The primary cell wall material is sourced (i.e. prepared) from plant parenchymal tissue. The microfibrils in the cleaning composition according to the invention are microfibrils obtained from primary cell wall material. The source of the plant parenchyma cells may be any plant that contains plant parenchyma cells having a cellulose skeleton. A plant cell wall typically contains cellulose and hemicellulose, pectin and in many cases lignin. This contrasts with the cell walls of fungi (which are made of chitin), and of bacteria, which are made of peptidoglycan. Primary plant cell walls contain lignin only in minor amounts, if at all. The primary cell wall material used in the cleaning composition according to the invention may comprise some lignin, like less than 10 wt % calculated on total amount of cell wall material, but preferably does not contain substantial amounts of lignified tissue. Preferably the primary cell wall material consists essentially of non-lignified tissue as understood by the skilled person in the area of plant biology.

Preferably the source of primary cell wall material is selected from parenchymal tissue from fruits, roots, bulbs, tubers, seeds, leaves and combination thereof; more preferably is selected from citrus fruit, tomato fruit, peach fruit, pumpkin fruit, kiwi fruit, apple fruit, mango fruit, sugar beet, beet root, turnip, parsnip, maize, oat, wheat, peas and combinations thereof; and even more preferably is selected from citrus fruit, tomato fruit and combinations thereof. A most preferred source of primary cell wall material is parenchymal tissue from citrus fruit.

The primary cell wall material may optionally have undergone several pre-treatment steps before it is brought in the defibrillated state. Such pre-treatments include but are not limited to heating, cooking, washing, refining, depectinating, as long as the defibrillated cell wall material comprising microfibrils is present in the cleaning composition as required by the present invention. Hence, the parenchymal tissue may for instance also be provided in the form of a puree.

Microfibrils

In the context of the present invention, the microfibrils present in or derived from the primary cell wall material, are the strongly self-associated fibrous structures typically found in plant cell walls. In the native plant tissue, they are conventionally present in the form of aggregates from a few tens of nanometres to a few micrometres. These aggregates consist of the elementary microfibrils. These elementary microfibrils are well-known. A typical microfibril generally comprises about 36 aligned beta-1-4-glucose polymer chains.

The cleaning composition according to the invention comprises 0.1 to 4 wt-% of defibrillated primary cell wall material comprising microfibrils. Here, the wt-% of the total composition is based on the dry weight of the primary cell wall material from which essentially all cold water soluble components have been removed (i.e. the insoluble fraction, which is also understood as the fibre fraction). The amount of defibrillated cell wall material may suitably be selected to obtain the desired effect and depends on the overall product format. It may for instance also depend on the typical level of dilution upon application and the amount of defibrillated cell wall material required in the lather upon its formation to provide the enhanced foam stability to the lather. Preferably, the amount of defibrillated cell wall material in the cleaning composition according to the invention is from 0.2 to 3 wt %, more preferably from 0.3 to 2 wt %, more preferably from 0.5 to 1.5 wt % and even more preferably from 0.7 to 1.2 wt %.

Preferably, the microfibrils are obtained from the primary cell wall material by removing soluble and unbound sugars, protein, polysaccharides, oil soluble oils, waxes and phytochemicals (e.g. carotenoids, lycopene). This is suitably achieved using well known techniques including cutting up the cell wall material, cooking, washing, centrifugation, decanting and drying as is well-known to the skilled person.

Preferably the primary cell wall material comprises at least 50 wt-% of microfibrils, more preferably at least 60 wt %, even more preferably at least 70 wt %, still more preferably at least 80 wt %, even still more preferably at least 90 wt % and most preferably the primary cell wall material consists essentially of microfibrils. Here, the wt-% is based on the dry weight of the primary cell wall material and the microfibrils.

Plant cell walls, especially in parenchymal tissue contain hemicelluloses and pectin in addition to cellulose. Thus, the microfibrils in the primary cell wall material may typically comprise cellulose, hemicellulose, and pectin. However, the primary cell wall material of the invention does not necessarily contain hemicellulose and/or pectin. The hemicellulose or part thereof may have been removed when the primary cell wall material is prepared from the plant parenchymal tissue. Therefore, the primary cell wall material of the invention optionally comprises hemicellulose, like for example in an amount of 0 to 40 wt %. Preferably the primary cell wall material comprises hemicelluloses, preferably in an amount of up to 40 wt %, like for example from 5 to 40 wt %, and more preferably in an amount from 10 to 30 wt %.

Likewise the pectin or part thereof may have been removed when the primary cell wall material is prepared from the plant parenchymal tissue. Therefore, the primary cell wall material of the invention optionally comprises pectin, like for example in an amount of 0 to 30 wt %. Preferably the primary cell wall material comprises pectin, preferably in an amount of up to 30 wt %, like for example from 5 to 30 wt %, and more preferably in an amount from 10 to 20 wt %.

Preferably the primary cell wall material of the invention comprises hemicelluloses and pectin.

The primary cell wall material in the cleaning composition of the invention comprises defibrillated cell wall material, i.e. the microfibrils that make up the fibers present in the primary cell wall are at least partially disentangled without breaking them. It is the degree of disentanglement that provides the cleaning composition of the present invention with its surprising properties. The, CHP, FHP and FDP parameters all correlate to this degree of disentanglement.

Preferably the average length of the microfibrils from the defibrillated primary cell wall material is more than 1 micrometer and preferably more than 5 micrometers.

At least 80 wt % of the microfibrils is smaller than 50 nm in diameter. Preferably at least 80 wt % of the microfibrils is smaller than 40 nm in diameter, more preferably smaller than 30 nm, even more preferably smaller than 20 nm and still more preferably smaller than 10 nm. The microfibril diameter can be suitably determined using the method described in the Examples section below.

The primary cell wall material is suitably defibrillated by subjecting it to mechanical energy and/or cavitation thereby disentangling the cellulose-containing microfibrils. This can be done as part of the process for obtaining the microfibrils from the primary cell wall material, thus resulting in isolated defibrillated cell wall material comprising microfibrils. Alternatively, the primary cell wall material can be combined with one or more of the other ingredients of the cleaning composition (including for example the surfactant) wherein the resulting mixture is subjected to mechanical energy and/or cavitation thereby disentangling the microfibrils in the cellulose fibers. The required level defibrillation can also be arrived at by a succession of various such disentanglement treatments, for example by first subjecting a dispersion of the primary cell wall material to a high shear treatment, and at later stage subjecting a premix of the cleaning composition to another high shear treatment. Alternatively, if the pre-processing of the primary cell wall material provides sufficient disentanglement to yield the required level of defibrillation in the final cleaning composition, it may suffice if the manufacturing steps in which the primary cell wall material is combined with the other constituents of the cleaning composition include only mixing steps of relatively low shear.

The cellulose in the microfibrils in the defibrillated primary cell wall material in any of the compositions of the present invention preferably has an average degree of crystallinity of less than 50%. Preferably the average degree of crystallinity of the cellulose in the microfibrils is less than 40%, more preferably less than 35% and even more preferably less than 30%. The table below shows the average degree of crystallinity of typical sources of cellulose microfibrils. It shows that the cellulose in primary cell wall material sourced from plant parenchymal tissue typically has a degree of crystallinity of less than 50 wt-%.

TABLE 1

Average degree of crystallinity of cellulose
(all polymorph cellulose I)

| Source | Average degree of crystallinity (%) |
|---|---|
| Tomato fibers | 32 |
| Citrus fiber (Citrus Fiber AQ + 30 N) | 29 |
| Nata de Coco | 74 |
| Cotton | 72 |
| Wood pulp fiber (Meadwestvaco) | 61 |
| Sugar beet fibre (Nordix Fibrex) | 21 |
| Pea fibres (PF200vitacel) | 42 |
| Oat fibres (780 Sunopta) | 43 |
| Corn hull (Z-trim) | 48 |
| Sugar cane Fiber (Ultracel) | 49 |

The average degree of crystallinity can be suitably determined according to the described in the Examples section below.

The Composition Homogeneity Parameter CHP

According to the first aspect of the invention, the cleaning composition has a composition homogeneity parameter CHP of at least 0.030. The CHP provides a measure for the extent to which the primary cell wall material has been defibrillated, based on confocal scanning laser microscopy (CSLM) performed on a standardised sample comprising the defibrillated cell wall material. The CHP of the cleaning composition is established by the following protocol. The protocol to establish the parameter includes three parts: sample preparation, CSLM microscopy to obtain micrographs of the sample, and digital image analysis to calculate the CHP value.

Thus, the protocol includes the sample preparation steps of a. preparing 300 ml of an aqueous, concentration-standardised sample at room temperature from the cleaning composition, wherein the concentration-standardised sample comprises the microfibrils contained in the defibrillated primary cell wall material at a concentration of 0.100 wt-% with respect to the weight of the standardised sample;

b. evenly distributing the primary cell wall material over the concentration-standardised sample volume by agitating the sample with a Silverson overhead mixer equipped with a small screen having 1 mm holes at 2000 rpm for 60 seconds;

c. dying the microfibrils by providing a 0.5%-w/v aqueous stock solution of Congo Red dye and contacting an aliquot of the standardised sample with an amount of the Congo Red solution, wherein the amount is 1.0 vol-% with respect to the volume of the aliquot of the standardised sample;

d. filling a sample holder suitable for performing CSLM with an aliquot of the dyed standardised sample.

In step c, for example, 2 mL of the standardised sample is contacted with 20 µl of the Congo Red solution. In order to ensure even distribution of the dye throughout the sample, it may for instance be gently shaken.

The sample holder of step d suitably includes two cover slides separated by a spacer comprising a bore of sufficient volume to enable the recording of sufficient micrographs for digital image analysis as described below.

To obtain micrographs, the protocol includes the following step:

e. imaging the dyed standardised sample with a confocal scanning laser microscope equipped with a diode-pumped solid state laser emitting at a wavelength of 561 nm and operated at a fixed laser power, using a 10× objective with a numerical aperture of 0.40, and thereby recording at least 25 independent micrographs at a resolution of 1024×1024 pixels where each pixel represents a sample size of within the range of 1490 by 1490 nm to 15400 by 1540 nm, adjusting the intensity and gain settings such that in every image between 0.1 and 5% of the pixels are saturated and recording the micrographs at a colour depth of at least 8 bits per pixel.

The CHP is a measure relating to the primary cell wall material. Therefore, micrographs should be recorded whilst avoiding imaging of air bubbles or the sample edge. Likewise, care should be taken to avoid imaging other objects of macroscopic dimensions that do not originate from the defibrillated primary cell wall material. This may conveniently be accomplished for instance by removing such objects of macroscopic dimensions during sample preparation in step a or by avoiding them in the sample whilst collecting micrographs.

Typically, one or more photomultiplier tubes are used as the light detectors in the microscope. Preferably the microscope is equipped with three photomultiplier tubes (PMTs). Independent micrographs are micrographs that are non-overlapping, both in the x-y plane and in the z-direction. The micrographs may suitably be recorded at a colour depth higher than 8 bits (for instance at 24 bit RGB), since this can easily be converted to a lower colour depth by well-known means.

The digital image analysis part of the protocol involves the following steps:

f. ensuring that the micrographs are present as or converted to a format with a single intensity value for each pixel;

g. normalising each individual micrograph by recalculating the pixel values of the image so that the range of pixel values used in the image is equal to the maximum range for the given colour depth, thereby requiring 0.4% of the pixels to become saturated;

h. obtaining for each individual micrograph the image histogram and removing spikes from each histogram by visual inspection;

i. for each individual image histogram determining the full width at half maximum (FWHM), by first determining the maximum count in the histogram and the channel containing this maximum count (the maximum channel), then counting the number N of channels between the first channel containing a value equal or higher than half the maximum and the last channel containing a value equal or higher than half the maximum thereby including this first and last channel in the count N, and then calculating the FWHM by dividing the count N by the total number of channels;

j. calculating the composition homogeneity parameter CHP, wherein CHP is the average of the FWHM values obtained for the individual micrographs.

The digital image analysis steps may suitably be carried out using well-known image analysis software including for instance ImageJ. The result of step f should be that the image is of a format wherein the intensity for each pixel is expressed as a single value.

This is for instance the case if the image is a "grey-scale" image. In contrast, images in RGB format or a related format having three intensity values per pixel should be converted. This is easily achieved by well-known operations in the field of digital image analysis. An example of a suitable output format would be a grey-scale image with 8 bits per pixel.

The normalising operation of step g is generally known as a histogram stretch operation or a contrast stretch operation. The normalisation is performed by allowing a small percentage of pixels in the image to become saturated. Here saturation includes both the minimum and maximum value for the given colour depth. In an 8 bit greyscale image, the minimum value would be 0 and typically displayed as black, whilst the maximum value would be 255 and typically displayed as white. The image histogram of step h is a well-known property for digital images, representing the distribution of the pixels over the possible intensities, by providing the pixel count for each intensity channel. For the purpose of the spike-removal of step h, the value for a particular channel is considered a spike if it is considerably higher than the values of the adjacent channels, typically at least a factor of 1.5 higher. The lower half-maximum channel in step i corresponds to the channel containing a count of half the maximum count that is furthest away from the maximum channel on the low-intensity side of the maximum channel. Analogously, the upper half-maximum channel corresponds to the channel containing a count of half the maximum count that is furthest away from the maximum channel on the high-intensity side of the maximum channel. The FWHM that is obtained in step i will be a value between 0 and 1.

A preferred way of establishing the CHP for the cleaning composition is by following the protocol in the way described in the Examples section below. The above protocol and the Examples provide methods of measuring the CHP. However, the CHP may also be determined by a different protocol, as long as that protocol would lead to the same physical result, i.e. it would yield the same CHP for a particular cleaning composition as the above protocol.

The cleaning composition preferably has a composition homogeneity parameter CHP of at least 0.031, more preferably at least 0.032, even more preferably at least 0.033, even more preferably at least 0.040 and still more preferably at least 0.050. Preferably, the cleaning composition has a CHP of at most 0.20, more preferably at most 0.15, and even more preferably at most 0.10.

The Fibre Homogeneity Parameter FHP

According to the second aspect of the invention, the degree of defibrillation of the primary cell wall material in the cleaning composition is suitably characterised by the fibre homogeneity parameter FHP. Like the CHP, the FHP is measured based on analysis of CSLM micrographs, but differs in the way the sample is prepared. The FHP is defined for the defibrillated primary cell wall material dispersed in water. That is, the FHP is determined for the separate primary cell wall material, not for the formulated cleaning composition.

Thus, the defibrillated primary cell wall material of the cleaning composition according to the fourth aspect of the invention has a fibre homogeneity parameter FHP of at least 0.022. The defibrillated primary cell wall material preferably has a fibre homogeneity parameter FHP of at least 0.025, more preferably at least 0.030, even more preferably at least 0.035, still more preferably at least 0.040, yet more preferably at least 0.045 and still more preferably at least 0.050. The defibrillated primary cell wall material preferably has a fibre defibrillation parameter FHP of at most 0.20, more preferably at most 0.15 and even more preferably at most 0.10.

The protocol to establish the FHP includes three parts: sample preparation, CSLM microscopy to obtain micrographs of the sample, and digital image analysis to calculate the FHP value, analogous to the protocol to establish the CHP.

Thus, the protocol includes the sample preparation steps of a. preparing 300 ml of a concentration-standardised sample at room temperature of the defibrillated primary cell wall material, wherein the concentration-standardised sample comprises the microfibrils contained in the defibrillated primary cell wall material at a concentration of 0.100 wt-% with respect to the weight of the standardised sample;

b. evenly distributing the primary cell wall material over the concentration-standardised sample volume by agitating the sample with a Silverson overhead mixer equipped with a small screen having 1 mm holes at 2000 rpm for 60 seconds;

c. dying the microfibrils by providing a 0.5%-w/v aqueous stock solution of Congo Red dye and contacting an aliquot of the standardised sample with an amount of the Congo Red solution, wherein the amount is 1.0 vol-% with respect to the volume of the aliquot of the standardised sample;

d. filling a sample holder suitable for performing CSLM with an aliquot of the dyed standardised sample.

The standardised sample of the defibrillated primary cell wall material may be prepared in different ways, which may be appropriately selected depending on the preparation conditions of the defibrillated primary cell wall material and/or the cleaning composition. Thus for example, the standardised sample may suitably be prepared by using a dispersion consisting essentially of the defibrillated primary cell wall material dispersed in water, wherein the dispersion results from a defibrillation process. This is particularly useful, if the primary cell wall material is subjected to a defibrillation step before it is contacted with other constituents of the cleaning composition. A possible alternative is to separate the primary cell wall material from the other constituents of the cleaning composition, after the latter has been prepared.

To obtain micrographs, the protocol includes the following step:

e. imaging the dyed standardised sample with a confocal scanning laser microscope equipped with a diode-pumped solid state laser emitting at a wavelength of 561 nm and operated at a fixed laser power, using an oil-immersed 40× objective with a numerical aperture of 1.25, and thereby recording at least 25 independent micrographs at a resolution of 1024×1024 pixels where each pixel represents a sample size of within the range of 350 by 350 to 400 by 400 nm, adjusting the intensity and gain settings such that in every image between 0.1 and 5% of the pixels are saturated and recording the micrographs at a colour depth of at least 8 bits per pixel.

Notably, the objective lens (i.e. an oil-immersed 40× objective) used in the protocol to determine the FHP differs from that used in the protocol to determine the CHP (i.e. a 10× objective).

The further parts of the protocol to determine the FHP—namely the digital image analysis—follows the same steps as steps f to j of the protocol described hereinabove for the determination of the CHP, with the proviso that in step j, the fibre homogeneity parameter FHP is calculated as the average of the FWHM values obtained for the individual micrographs.

A preferred way of establishing the FHP for the cleaning composition is by following the protocol in the way described in the Examples section below for the CHP, whilst taking into account the above differences between the methods to measure the CHP and the FHP. The above protocol and the Examples provide methods of measuring the FHP. However, the FHP may also be determined by a different protocol, as long as that protocol would lead to the same physical result, i.e. it would yield the same FHP for a particular cleaning composition as the above protocol.

The Fibre Defibrillation Parameter FDP

According to the third aspect of the invention, the degree of defibrillation of the primary cell wall material in the cleaning composition is suitably characterised by the fibre defibrillation parameter FDP. The FDP provides a measure for the extent to which the primary cell wall material has been defibrillated, based on an NMR (nuclear magnetic resonance) method performed on a standardised sample comprising the defibrillated cell wall material. Like the FHP, the FDP is defined for the defibrillated primary cell wall material dispersed in water. That is, the FDP is determined for the separate primary cell wall material, not for the fully formulated cleaning composition.

Thus, the defibrillated primary cell wall material of the cleaning composition according to the third aspect of the invention has a fibre defibrillation parameter FDP of at least 0.10 Hz. The defibrillated primary cell wall material preferably has a fibre defibrillation parameter FDP of at least 0.11 Hz, more preferably at least 0.12 Hz, even more preferably at least 0.13 Hz, even more preferably at least 0.15 Hz and still more preferably at least 0.18 Hz. The defibrillated primary cell wall material preferably has a fibre defibrillation parameter FDP of at most 0.50 Hz, more preferably at most 0.40 Hz, even more preferably at most 0.30 Hz and still more preferably at most 0.20 Hz.

The protocol to establish the fibre defibrillation parameter FDP includes three parts: sample preparation, NMR measurement to collect CPMG relaxation decay data, and data analysis to calculate the FDP value.

Thus, the protocol includes the sample preparation steps of
  a. preparing 300 ml of a concentration-standardised sample at room temperature of the defibrillated primary cell wall material, wherein the concentration-standardised sample comprises the microfibrils contained in the defibrillated primary cell wall material at a concentration of 0.100 wt-% with respect to the weight of the standardised sample;
  b. evenly distributing the primary cell wall material over the concentration-standardised sample volume by agitating the sample with a Silverson overhead mixer equipped with a small screen having 1 mm holes at 2000 rpm for 60 seconds;
  c. adjusting the pH of the concentration-standardised sample to 3.3±0.1;
  d. transferring an aliquot of the concentration- and pH-standardised sample to a flat-bottom NMR tube of 10 mm diameter, ensuring a fill height such that upon placement of the sample in the NMR spectrometer of step h, the fill height is within the region where the radiofrequent field of the coil of the NMR spectrometer is homogeneous.

The standardised sample of the defibrillated primary cell wall material may be prepared in different ways, which may be appropriately selected depending on the preparation conditions of the defibrillated primary cell wall material and/or the cleaning composition.

Thus for example, the standardised sample may suitably be prepared by using a dispersion consisting essentially of the defibrillated primary cell wall material dispersed in water, wherein the dispersion results from a defibrillation process. This way of preparing the standardised sample is preferred and is particularly useful if the primary cell wall material is subjected to a defibrillation step before it is contacted with other constituents of the cleaning composition. A possible alternative is to separate the primary cell wall material from the other constituents of the cleaning, after the latter has been prepared.

The distributing step b is intended to provide an even distribution of the microfibril material over the sample volume, whilst having a limited and controlled effect on the level of defibrillation of the sample. In step c, the pH is suitably standardised with the aid of citric acid. The optimal fill height in step d may depend on the type of NMR spectrometer used, as known by the skilled person. It will typically be about 1 cm.

In the further steps of the protocol, the concentration- and pH-standardised sample will be referred to as the standardised sample.

The data analysis requires comparison of a $T_2$ distribution curve (see below) of the standardised sample with a matrix reference sample, which should preferably be essentially free from microfibril material. Therefore, the protocol also includes the step of:
  e. preparing a matrix reference sample by centrifuging an aliquot of the standardised sample in a 2 ml Eppendorf cup at a relative centrifugation force of 15000 for 10 minutes and transferring the supernatant to a flat-bottom NMR tube of 10 mm diameter, ensuring a fill height such that upon placement of the sample in the NMR spectrometer of step h, the fill height is within the region where the radiofrequent field of the coil of the NMR spectrometer is homogeneous.

Subsequently, to collect and analyse the data, the protocol includes the steps of:
  f. equilibrating the NMR tubes at a temperature of 20° C.;
  g. recording relaxation decay data for the standardised sample at 20° C. on an NMR spectrometer operating at a proton resonance frequency of 20 MHz, using a CPMG (Carr Purcell Mayboom Gill) $T_2$ relaxation pulse sequence, with a 180° pulse spacing of 200 microseconds, and a recycle delay time of 30 seconds;
  h. recording relaxation decay data for the matrix reference sample under the same conditions as in step h;
  i. performing inverse Laplace transformation to the obtained decay data for both the standardised sample and the matrix reference sample, requiring $T_2$ to be in the range of 0.01 to 10 seconds;
  j. identifying in the $T_2$ distribution curve of the standardised sample the peak corresponding to the water protons of which the $T_2$ is averaged by exchange between the bulk water phase and the surface of the defibrillated primary cell wall material and identifying in the $T_2$ distribution curve of the matrix reference sample the peak corresponding to the bulk water phase;
  k. calculating $T_2$(sample), which is defined as the weighted average $T_2$ value for the identified peak in the $T_2$ distribution curve of the standardised sample and similarly calculating $T_2$(matrix) which is defined as the weighted average $T_2$ value for the identified peak in the $T_2$ distribution curve of the matrix reference sample;
  l. calculating the values of $R_2$(sample) and $R_2$(matrix), where:

$R_2(\text{sample}) = 1/T_2(\text{sample})$, and $R_2(\text{matrix}) = 1/T_2(\text{matrix})$;

m. calculating the fibre defibrillation parameter FDP of the defibrillated primary cell wall material as $$FDP=R_2(\text{sample})-R_2(\text{matrix}).$$

The CPMG $T_2$ relaxation pulse sequence is well-known in the field of NMR spectroscopy (See *Effects of diffusion on free precession in nuclear magnetic resonance experiments*, Carr, H. Y., Purcell, E. M., *Physical Review*, Volume 94, Issue 3, 1954, Pages 630-638/*Modified spin-echo method for measuring nuclear relaxation times*, Meiboom, S., Gill, D., *Review of Scientific Instruments*, Volume 29, Issue 8, 1958, Pages 688-691) Suitable time domain NMR spectrometers are well-known to perform this type of spectroscopy are well-known. Similarly, the usual measures to ensure the recording of reliable data are well-known in the field of time domain NMR spectroscopy. For example, the field should be sufficiently homogeneous at the locus where the sample volumes are placed. The field homogeneity can be checked by verifying whether a reference sample of pure water, yields a $T_2^*$ (T-two-star) for water protons of more than 2 milliseconds.

The inverse Laplace transformation of step i may suitably be carried out using a non-negative least square constraints algorithm lsqnonneg (Lawson, C. L. and R. J. Hanson, *Solving Least Squares Problems*, Prentice-Hall, 1974, Chapter 23, p. 161), with the regularisation parameter lambda set to 0.2. Software packages suitable for implementing the algorithm and carrying out the transform are well-known, Matlab being an example of such software.

In step j the peak that is selected in the $T_2$ distribution curve of the standardised sample, typically is the dominant peak, if the system is sufficiently homogeneous. In general, the peak that should be selected in the $T_2$ distribution curve is that corresponding to water protons of which the $T_2$ is averaged by diffusion and chemical exchange between bulk and surface sites of the defibrillated primary cell wall material. This peak is particularly well-defined if the defibrillated primary cell wall material is evenly distributed over the standardised sample. In most typical cases, there will be only one such peak, as can be seen in the examples in the Examples section below.

The weighted average $T_2$ in step I is for example suitably calculated by the summation $$\frac{\sum I(T_2) \cdot T_2}{\sum I(T_2)}$$

Here, $1(T_2)$ is the intensity at value $T_2$ and both summations are over the width of the peak.

A preferred way of establishing the FDP for the cleaning composition is by following the protocol in the way described in the Examples section below for the FDP. The above protocol and the Examples provide methods of measuring the FDP. However, the FDP may also be determined by a different protocol, as long as that protocol would lead to the same physical result, i.e. it would yield the same FDP for a particular cleaning composition as the above protocol.

Combination of Parameters

Cleaning compositions wherein the above-specified requirements for the CHP, FHP, and FDP are simultaneously satisfied for more than one of the CHP, FHP, and FDP are also contemplated. For example, a cleaning composition wherein the composition homogeneity parameter CHP has a value as specified hereinabove and simultaneously a fibre defibrillation parameter FDP as defined hereinabove is preferred. Likewise, a cleaning composition wherein the fibre homogeneity parameter FHP has a value as specified hereinabove and simultaneously a fibre defibrillation parameter FDP as defined hereinabove is also preferred.

Methods

According to the fourth and fifth aspects, the invention relates to methods for preparing a cleaning composition as defined hereinabove. A cleaning composition made according to the present methods surprisingly provides enhanced foam stability, in particular if the composition is diluted to form suds or a lather. These surprising properties are believed to be due to the particular processing conditions and their effect on the primary cell wall material comprising microfibrils.

The methods according to the invention are methods wherein the cleaning composition comprises water, one or more detergent surfactants, and defibrillated primary cell wall material comprising microfibrils.

The method according to any aspect of the invention is preferably a method for preparing a cleaning composition according to the invention as described hereinabove. Thus, any preferences regarding the cleaning composition according to the invention apply here too. The method preferably is a method for preparing a cleaning composition in a form suitable for domestic use (including for example hand dish wash formulations). In particular it is preferred that it is a method for preparing a cleaning composition according to the first aspect of the invention, or according to the second aspect of the invention, or according to the third aspect of the invention.

The primary cell wall material is preferably sourced as indicated for the cleaning composition above. It is particularly preferred that the primary cell wall material includes citrus fibre.

Method According to the Fourth Aspect of the Invention

Step ii of the method according the fourth aspect of the invention involves dispersing the primary cell wall material in an aqueous phase. Any method to disperse the primary cell wall material is considered, as long as it yields a dispersion that is suitable for the treatment in step iii. Thus, the dispersion step may involve stirring, mixing, or another treatment of relatively low shear, such as treatment with an overhead or inline Silverson mixer.

The aqueous dispersion of step ii comprises between 0.1 and 1 wt-% of the primary cell wall material. Preferably, it comprises between 0.1 and 3 wt-%, more preferably between 0.5 and 1.5 wt-% of the primary cell wall material.

The treatment of step iii to obtain a dispersion comprising defibrillated primary cell wall material involves subjecting the primary cell wall material to mechanical shearing and/or cavitation. To this effect, the treatment includes a high shear treatment step selected from high pressure homogenisation at a pressure of between 500 and 2000 bar and microfluidising at a pressure of between 500 and 2000 bar.

Both high pressure homogenisation and microfluidisation are well-known techniques, involving well-known equipment. Preferably, the high shear treatment step is high pressure homogenisation as specified, more preferably, it is high pressure homogenisation at a pressure of between 500 and 1000 bar, and even more preferably at a pressure of between 600 and 800 bar.

Thus, it is especially preferred that the aqueous phase of step ii comprises between 0.2 and 1 wt-% of the primary cell wall material and the high shear treatment step of step iii is high pressure homogenisation at a pressure of between 600 and 800 bar.

The precise pressure and the number of passes and/or stages of the treatment—be it high pressure homogenisation or microfluidisation—that is required to obtain the benefits of the present invention may depend for instance on the concentration of the primary cell wall material present and on its level of comminution/pre-treatment before this step, but is easily determined by experimentation.

The treatment in step iii is such that upon this treatment the fibre homogeneity parameter FHP of the defibrillated primary cell wall material is at least 0.022. Here the fibre defibrillation parameter FHP is defined and determined as described above. The defibrillated primary cell wall material preferably has a fibre homogeneity parameter FHP of at least 0.025, more preferably at least 0.030, even more preferably at least 0.035, still more preferably at least 0.040, yet more preferably at least 0.045 and still more preferably at least 0.050. The defibrillated primary cell wall material preferably has a fibre defibrillation parameter FHP of at most 0.20, more preferably at most 0.15 and even more preferably at most 0.10.

Similarly, it is also preferred that the treatment in step iii is preferably such that upon this treatment the fibre defibrillation parameter FDP of the defibrillated primary cell wall material is at least 0.10 Hz. Here the fibre defibrillation parameter FDP is defined and determined as described above. The defibrillated primary cell wall material preferably has a fibre defibrillation parameter FDP of at least 0.11 Hz, more preferably at least 0.12 Hz, even more preferably at least 0.13 Hz, even more preferably at least 0.15 Hz and still more preferably at least 0.18 Hz. The defibrillated primary cell wall material preferably has a fibre defibrillation parameter FDP of at most 0.50 Hz, more preferably at most 0.40 Hz, even more preferably at most 0.30 Hz and still more preferably at most 0.20 Hz.

The FHP and/or FDP can in particular be conveniently determined if the aqueous dispersion consists substantially of water and primary cell wall material, since in that case, the sample preparation step of the protocols to determine the FDP and/or FHP are relatively straight-forward.

Surprisingly beneficial properties of the cleaning composition made by the present method (in terms of enhanced foam stability whilst maintaining other desirable properties) are obtained when the treatment in step iii is such that the above preferred requirements for the FDP and/or the FHP are met.

Constituents of the cleaning composition other than the primary cell wall material are independently mixed into the aqueous phase before step ii, between steps ii and iii, between steps iii and iv or after step iv. These constituents include the one or more detergent surfactants. The other constituents can be mixed at the stage that is most convenient and/or efficient depending on the type of constituents and the product format as will be known and appreciated by the skilled person. However, care should be taken that the aqueous dispersion in step iii is suitable for the treatment it is subjected to.

The method according to the invention may suitably involve other routine steps and equipment that are usual and well-known in the field of manufacture of cleaning compositions, in particular with regard to cleaning compositions for domestic use.

Method According to the Fifth Aspect of the Invention

The preferences and considerations relating to the method according to the fourth aspect of the invention similarly apply to this method. Thus, for instance, the treatment of step iii typically involves one or more high-shear treatments selected from high pressure homogenisation and microfluidising. For this method any number and order of such treatment steps is contemplated as long as the requirements of the FDP and/or FHP are met for the resulting cleaning composition. Other steps may be present in between such multiple shearing steps, including for example the mixing in of other ingredients.

The treatment of step iii is such that that the fibre defibrillation parameter FDP of the defibrillated primary cell wall material is at least 0.10 Hz or the fibre homogeneity parameter FHP of the defibrillated primary cell wall material is at least 0.022. Preferably, the treatment is such that the fibre defibrillation parameter FDP is at least 0.11 Hz, more preferably at least 0.12 Hz, even more preferably at least 0.13 Hz, even more preferably at least 0.15 Hz and still more preferably at least 0.18 Hz. The fibre defibrillation parameter FDP preferably is at most 0.50 Hz, more preferably at most 0.40 Hz, even more preferably at most 0.30 Hz and still more preferably at most 0.20 Hz.

The defibrillated primary cell wall material preferably has a fibre homogeneity parameter FHP of at least 0.025, more preferably at least 0.030, even more preferably at least 0.035, still more preferably at least 0.040, yet more preferably at least 0.045 and still more preferably at least 0.050. The defibrillated primary cell wall material preferably has a fibre defibrillation parameter FHP of at most 0.20, more preferably at most 0.15 and even more preferably at most 0.10.

Cleaning Composition Obtainable by the Methods of the Invention

According to the sixth aspect, the present invention relates to a cleaning composition obtainable by a method according to the invention, because the method according to the invention yields cleaning compositions exhibiting desirable properties, including enhanced foam stability by virtue of the particular structure that results from this method.

It is preferred that the cleaning composition is obtainable by the method according to the fourth aspect of the invention wherein the aqueous dispersion of step ii comprises between 0.1 and 1.0 wt-% of the primary cell wall material and the high shear treatment step of step iii is high pressure homogenisation at a pressure of between 700 and 1000 bar.

Likewise, it is preferred that the cleaning composition is obtainable by the method according to the fourth or the fifth aspect of the invention, wherein the treatment in step iii is such that upon this treatment the fibre defibrillation parameter FDP of the defibrillated primary cell wall material is at least 0.10 Hz. Here the fibre defibrillation parameter FDP is defined and determined as described above. The defibrillated primary cell wall material preferably has a fibre defibrillation parameter FDP of at least 0.11 Hz, more preferably at least 0.12 Hz, even more preferably at least 0.13 Hz, even more preferably at least 0.15 Hz and still more preferably at least 0.18 Hz. The defibrillated primary cell wall material preferably has a fibre defibrillation parameter FDP of at most 0.50 Hz, more preferably at most 0.40 Hz, even more preferably at most 0.30 Hz and still more preferably at most 0.20 Hz.

Analogously, it is preferred that cleaning composition is obtainable by the method according to the fourth or the fifth aspect of the invention, wherein the treatment in step iii is such that upon this treatment the fibre homogeneity parameter FHP of the defibrillated primary cell wall material is at least 0.022. The defibrillated primary cell wall material preferably has a fibre homogeneity parameter FHP of at least 0.025, more preferably at least 0.030, even more preferably at least 0.035, still more preferably at least 0.040, yet more preferably at least 0.045 and still more preferably at least 0.050. The defibrillated primary cell wall material preferably has a fibre defibrillation parameter FHP of at most 0.20, more preferably at most 0.15 and even more preferably at most 0.10.

Uses According to the Present Invention

The invention also relates to use of defibrillated cell wall material comprising microfibrils to increase the foam stability of a cleaning composition comprising water and 0.1 to 70 wt-% of one or more detergent surfactants, wherein the cleaning composition has a composition homogeneity parameter CHP of at least 0.030. Here the CHP is defined and determined as described above. The cleaning composition preferably has a composition homogeneity parameter CHP of at least 0.031, more preferably at least 0.032, even more preferably at least 0.033, even more preferably at least 0.040 and still more preferably at least 0.050. Preferably, the cleaning composition has a CHP of at most 0.20, more preferably at most 0.15, and even more preferably at most 0.10

The invention also relates to use of defibrillated cell wall material comprising microfibrils to increase the foam stability of a cleaning composition comprising water and 0.1 to 70 wt-% of one or more detergent surfactants, wherein the defibrillated cell wall material has a fibre defibrillation parameter FDP of at least 0.010 Hz. Here the fibre defibrillation parameter FDP is defined and determined as described above. The defibrillated primary cell wall material preferably has a fibre defibrillation parameter FDP of at least 0.11 Hz, more preferably at least 0.12 Hz, even more preferably at least 0.13 Hz, even more preferably at least 0.15 Hz and still more preferably at least 0.18 Hz. The defibrillated primary cell wall material preferably has a fibre defibrillation parameter FDP of at most 0.50 Hz, more preferably at most 0.40 Hz, even more preferably at most 0.30 Hz and still more preferably at most 0.20 Hz.

The invention also relates to use of defibrillated cell wall material comprising microfibrils to increase the foam stability of a cleaning composition comprising water and 0.1 to 70 wt-% of one or more detergent surfactants, wherein the cleaning composition has a composition homogeneity parameter FHP of at least 0.022. The defibrillated primary cell wall material preferably has a fibre homogeneity parameter FHP of at least 0.025, more preferably at least 0.030, even more preferably at least 0.035, still more preferably at least 0.040, yet more preferably at least 0.045 and still more preferably at least 0.050. The defibrillated primary cell wall material preferably has a fibre defibrillation parameter FHP of at most 0.20, more preferably at most 0.15 and even more preferably at most 0.10.

EXAMPLES

The invention can be better understood by virtue of the following non-limiting examples.

General

Microfibril Characterisation: Degree of Crystallinity of Cellulose-Containing Microfibrils Wide angle X-ray scattering (WAXS) is used to determine the degree of crystallinity, using the following protocol. The measurements were performed on a Bruker D8 Discover X-ray diffractometer with GADDS (General Area Detector Diffraction System) (From Bruker-AXS, Delft, NL) (Part No: 882-014900 Serial No: 02-826) in a theta/theta configuration. A copper anode was used, and the K-alpha radiation with wavelength 0.15418 nm was selected. The instrumental parameters as used are shown in the table below.

TABLE 2

D8 Discover instrumental parameters for WAXS measurements

| | 2θ (9-42°) |
|---|---|
| Theta 1 | 10.000 |
| Theta 2 | 10.000/25.000 |
| Detector Bias (kV/mA) | 40/40 |
| Time (sec) | 300 |
| Collimator (mm) | 0.3 |
| Detector distance (cm) | 25 |
| Tube Anode | Cu |

The degree of crystallinity Xc was calculated from the following equation:

$$Xc(\%) = \frac{\text{Area crystalline phase}}{\text{Area crystalline} + \text{amorphous phase}} * 100\%$$

The areas of the diffraction lines of the crystalline phase were separated from the area of the amorphous phase by using the Bruker EVA software (version 12.0).

Microfibril Characterisation: Diameter of Microfibrils

Transmission electron microscopy (TEM) was used to directly determine the diameter of the microfibrils (D. Harris et. al. Tools for Cellulose Analysis in Plant Cell Walls Plant Physiology, 2010(153), 420). The dispersion of plant source rich in primary cell wall material was diluted in distilled water resulting in a thin layer of mostly single fibers or single clusters of fibers. The dispersions were imaged on a Carbon only 300 mesh Copper TEM grid (Agar Scientific) and imaged using a Tecnai 20 Transmission electron microscope (FEI Company) operated at a voltage of 200 kV. To enhance image contrast between individual microfibrils, a 2% phosphotungstic acid solution at pH 5.2 was used as a negative stain. For this the fiber-loaded TEM grids were incubated on 2% phosphotungstic acid and air-dried after removal of the excess of fluid.

Centrifugation Force

Where the centrifugation force is given, it is given as a dimensional "relative centrifugal force", which is defined as $\tau \omega^2/g$, where $g=9.8$ m/s$^2$ is the Earth's gravitational acceleration, r is the rotational radius of the centrifuge, $\omega$ is the angular velocity in radians per unit time. The angular velocity is $\omega=\text{rpm}\times 2\pi/60$, where rpm is the centrifuge "revolutions per minute".

Examples 1 to 3

Hand Dishwash Composition with Enhanced Foam Stability

Compositions according to the invention were prepared and compared with a comparative example according to WO 2013/160024 A1.

Preparation of Comparative Example A

To 980 grams of demineralised water in a beaker, citrus fibre (Herbacel AQ+ type N ex Herbafoods) was added in an amount to form a 2 wt-% dispersion. The citrus fibre was allowed to hydrate under stirring for 20 minutes. The resulting dispersion was homogenised by passing it over high pressure homogeniser (Niro Soavi, Panda NS 1001L), at a pressure of 500 bar. An aliquot of the resulting homogenised dispersion was combined with additional demineralised water (amounts as indicated in Table 3), ensuring even distribution of the defibrillated material over the composition volume by mixing with a Silverson L4RT-A overhead stirrer with a screen with 1 mm round holes at 2000 rpm for 60 seconds. The remaining ingredients as indicated in Table 3 were subsequently added and dissolved by stirring.

Preparation of Examples 1, 2, 3

To 793 grams of demineralised water in a beaker, citrus fibre (Herbacel AQ+ type N ex Herbafoods) was added in an amount corresponding to 0.25 wt-% of the final cleaning composition. The citrus fibre was allowed to hydrate under stirring for 20 minutes.

SLES (sodium lauryl ether sulfate) and NaLAS (sodium linear alkyl benzene sulphonate) were added upon mixing in the amounts as indicated in Table 3. The resulting dispersion was homogenised by passing it over high pressure homogeniser (Niro Soavi, Panda NS 1001L), at a pressure of 500 bar (Example 1), 700 bar (Example 2), and 1000 bar (Example 3), respectively. The remaining ingredients as indicated in Table 3 were subsequently added to the resulting homogenised dispersion and dissolved by stirring.

TABLE 3

| Ingredients | Comparative example A (wt-%) | Examples 1-3 (wt-%) |
| --- | --- | --- |
| Demineralised water | 67.06 | 79.3 |
| Herbacel AQ+ type N | — | 0.25 |
| Homogenised citrus fibre dispersion (2 wt % CF) | 12.50 | — |
| SLES 1EO (70 wt % solution in water) | 5.36 | 5.36 |
| NaLAS (90 wt %) | 12.50 | 12.50 |
| MgSO$_4$ 7H$_2$O | 2.50 | 2.50 |
| Nipacide BIT20 (preservative) | 0.08 | 0.08 |
| Total | 100.00 | 100.00 |

Characterisation of the Composition: Determination of the Composition Homogeneity Parameter CHP The composition homogeneity parameter CHP was determined for the cleaning compositions of each of the examples 1-3, and for comparative example A. The protocol to establish the parameter includes three parts: sample preparation, confocal scanning laser microscopy (CSLM), and digital image analysis to calculate the CHP value.

CHP—Sample Preparation

An aliquot of each example was diluted to a citrus fibre concentration of 0.100 wt-% in demineralised water (yielding 300 g of diluted dispersion) in a 500 ml plastic beaker. The mixture was stirred in a beaker of 80 mm diameter using a Silverson L4RT-A overhead mixer (small screen, 1 mm holes) at 2000 rpm for 60 seconds. This mixing step ensures that the citrus fibre is evenly distributed over the diluted sample volume.

For each example, a volume of 2 mL of the resulting diluted sample was taken with a Finn pipette (Labsystems 4500, H37095) and deposited in an Eppendorf safelock tube. To this 20 µL of a 0.5 w/v % aqueous solution of Congo Red dye was added with a Finn pipette (Labsystems 4027, H56580). The sample was gently shaken to distribute the dye. For imaging, a sample holder was filled with the dyed sample material. The sample holder consisted of two cover slides separated by a spacer. The spacer was a rectangular glass slide of 3 mm thick with a circular hole (0.5 cm diameter) in which the sample could be deposited.

CHP—Confocal Scanning Laser Microscopy

Confocal scanning laser microscopy (CSLM) was performed on a Leica TCS-SP5 confocal microscope in combination with a DM16000 inverted microscope frame. The Diode-Pumped-Solid-State (DPSS) 561 laser emitting at 561 nm was used at a fixed laser power of 58% for imaging with the Congo red dye. For detection, the system is equipped with three PMT (photomultiplier tube) detectors.

Images were taken with a 10× objective with a numerical aperture of 0.40 (section thickness 6.23 µm). Tile scans of 2 by 2 images at, at least, 7 different depths were recorded to yield 25 non-overlapping images for analysis. Care was taken not to image the edges of the sample holder; images were taken at a few micrometres distance from the edge. When samples contained air bubbles care was taken to only record images that did not contain any bubbles in the field of view. The PMTs were adjusted by using the "smart gain" and "smart offset" options to prevent over-saturation of the images. Intensity and gain were then adjusted such that between 0.1 and 5% of the pixels are saturated. The resolution of the images was set to 1024 by 1024 pixels and a line averaging of 3 was used. Each pixel represented a sample area of 1515.2 by 1515.2 nm. After imaging, the individual pictures that make up the tile scan were exported as tiff files with a colour depth of 24 bit RGB without incorporating any scale bar (the reconstructed larger tile images were not used in the image analysis).

CHP—Digital Image Analysis

For the image analysis the program ImageJ (freeware downloadable from: http://rsbweb.nih.gov/ij/) was used together with Microsoft Excel. Each image was converted to an 8 bit grey scale before analysis. In the analysis, images are first normalized (i.e. a histogram stretch) using the "enhanced contrast" option of ImageJ, allowing 0.4% of the pixels to become saturated. After this procedure, the histogram containing the distribution of pixel intensities was calculated. The resulting list containing the number of pixels per channel, in which each channel represents one of the 256 grey scale values in the image was transferred to Microsoft Excel. Before determination of the maximum of the distribution, spikes/outliers were removed from the obtained histogram by visual inspection, considering that a channel displaying a spike has a considerably larger value than the channels immediately adjacent to it (~2 times or higher). When the histogram displays a smooth distribution, the value of the spike is larger than the maximum of this distribution and located on the right or left of the true maximum. After removal, the maximum of the distribution is determined and divided by two. The full width at half maximum (FWHM) was determined by counting the channels that have a value higher or equal to half the maximum. Any channel containing a zero value that is adjacent to a channel with a count higher than half the maximum is included in the count. The obtained channel count is divided by 256 to yield a FWHM number between 0 and 1 for each individual image. The composition homogeneity parameter is then calculated as the arithmetic average of the FWHM values obtained for the individual images of a particular sample. The reported error is the standard deviation of this average. The characterisation of the examples in terms of their CHP is summarised in Table 4.

TABLE 4

Composition homogeneity parameter CHP

| Example | CHP | standard deviation |
|---|---|---|
| A | 0.0247 | 0.003 |
| 1 | 0.0336 | 0.003 |
| 2 | 0.0445 | 0.005 |
| 3 | 0.0620 | 0.010 |

Confocal Scanning Micrographs

Figure 2:
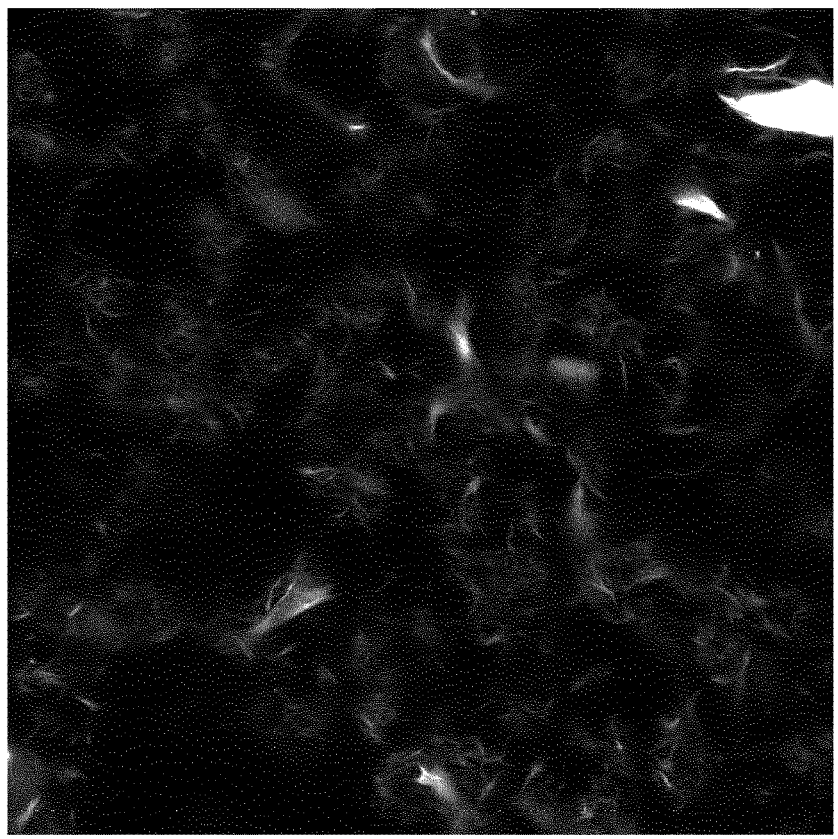
FIG. 2 shows a confocal scanning laser micrograph of Example 3.

The difference between examples according to the invention and comparative examples is clearly visible in micrographs. FIG. 1 shows a micrograph of the sample (at 0.10 wt-%) of Comparative Example A. FIG. 2 shows a micrograph of the sample (at 0.10 wt-%) of Example 3. Both micrographs were recorded under the same conditions, using the samples and the microscope as described above. The micrographs were taken with an oil-immersed 40× objective with a numerical aperture of 1.25 (section thickness 0.968 μm), using Leica Immersion oil without auto fluorescence conforming to DIN 58884/ISO 8036/1. Both micrographs represent a sample area of 387.5 by 387.5 μm.

Foam Stability

The formulations of compositions A and 1-3 were aerated using a Kenwood Chef Classic orbital mixer with a whisk utensil. Demi-water (190 grams) and 10 grams of composition were placed in the bowl of the mixer, followed by mixing for 1 minute at preset 5. The contents of the bowl were transferred to a 1 litre polypropylene beaker (bottom diameter 96 mm, height 182 mm, ex Vitlab). In the beaker a liquid layer and a clearly discernable foam layer are formed within several minutes. The volume of the foam was recorded every 30 minutes up until 120 minutes after the start of the experiment. The resulting foam volumes are presented in Table 5 below.

TABLE 5

Foam stability

| Incubation time | Foam volume (ml ± sd, n = 5) | | | |
|---|---|---|---|---|
| (min) | A | 1 | 2 | 3 |
| 0 | 920 ± 21 | 993 ± 43 | 990 ± 34 | 1022 ± 26 |
| 30 | 634 ± 21 | 698 ± 33 | 722 ± 49 | 770 ± 35 |
| 60 | 228 ± 40 | 296 ± 26 | 334 ± 70 | 330 ± 47 |
| 90 | 74 ± 21 | 105 ± 21 | 120 ± 27 | 138 ± 24 |
| 120 | 32 ± 8 | 48 ± 8 | 76 ± 27 | 72 ± 13 |

Table 6 below provides a comparison of the change in foam volume relative to that of the comparative A, according to the formula:

$$R_n(t) = \frac{V_n(t)/V_n(0)}{V_A(t)/V_A(0)}$$

Here, $R_n(t)$ is the relative foam volume of Example n (n being A, 1, 2, or 3) at time t, $V_n(t)$ is the foam volume of Example n at time t.

TABLE 6

| Incubation time | Relative foam volume | | | |
|---|---|---|---|---|
| (min) | A | 1 | 2 | 3 |
| 0 | 1 | 1 | 1 | 1 |
| 30 | 1 | 1.02 | 1.06 | 1.09 |
| 60 | 1 | 1.20 | 1.36 | 1.30 |
| 90 | 1 | 1.31 | 1.51 | 1.68 |
| 120 | 1 | 1.39 | 2.21 | 2.03 |

Table 5 shows that the foam volume decreased over time for all of the Examples 1 to 3. However, as Table 6 shows, the relative foam volume (relative to the volume of the comparative example) increases over time for all three Examples according to the present invention. This demonstrates that the foams of the compositions of the invention decay significantly slower than the comparative foam.

Example 4

Determination of the Fibre Defibrillation Parameter FDP

The fibre defibrillation parameter FDP can be determined for the defibrillated primary cell wall material in the following way.

FDP—Sample Preparation

An aliquot of a dispersion comprising defibrillated primary cell wall material was diluted to a microfibril concentration of 0.100 wt-% in demineralised water (yielding 300 g of diluted dispersion) in a 500 ml plastic beaker. The mixture was stirred in a beaker of 80 mm diameter using a Silverson L4RT-A overhead mixer (small screen, 1 mm holes) at 2000 rpm for 60 seconds. This mixing step ensures that the citrus fibre is evenly distributed over the diluted sample volume. Finally the pH was adjusted to 3.3 with citric acid.

An aliquot of the resulting diluted and pH-standardised sample was transferred directly to a 18 cm flat bottom NMR tube of 10 mm diameter at a filling height of 1 cm. In order to do a background correction, another aliquot was centrifuged (Eppendorf Centrifuge 5416) ata relative centrifugation force of 15000 for 10 min. in a 2 ml Eppendorf cup, from which the top layer without fibre (matrix) was subsequently transferred to another 18 cm flat bottom NMR tube at a filling height of 1 cm, which we refer to as a matrix reference sample. Both samples and matrix reference samples were incubated and equilibrated at 20° C. for 10 min. prior to the measurement.

FDP—Measurement

CPMG relaxation decay data were collected for each sample and for each matrix reference sample. A Bruker MQ20 Minispec was deployed operating at a resonance frequency for protons of 20 MHz, equipped with a variable temperature probehead stabilised at 20° C. Measurements were performed using a CPMG (Carr Purcell Mayboom Gill) $T_2$ relaxation pulse sequence to observe the relaxation decay at 20° C. (See *Effects of diffusion on free precession in nuclear magnetic resonance experiments*, Carr, H. Y., Purcell, E. M., *Physical Review*, Volume 94, Issue 3, 1954, Pages 630-638/*Modified spin-echo method for measuring nuclear relaxation times*, Meiboom, S., Gill, D., *Review of Scientific Instruments*, Volume 29, Issue 8, 1958, Pages 688-691). Data were collected with the 180° pulse spacing set to 200 μs, a recycle delay time of 30 sec., a 180°-pulse length of 5 μs (microseconds) and using 14.7 k 180°-pulses.

The sequence deploys a phase cycle and complex mode detection. Prior to measurement, the suitability of the NMR system for these measurements (in terms of field homogeneity etc.) was checked by verifying that the $T_2^*$ of pure water was >2 ms.

FDP—Data Analysis

Data were processed with Matlab using a singular value decomposition to phase correct the quadrature data ("Towards rapid and unique curve resolution of low-field NMR relaxation data: trilinear SLICING versus two-dimensional curve fitting", Pedersen, H. T., Bro, R., Engelsen, S. B., Journal of Magnetic Resonance. August 2002; 157(1), Pages 141-155. DOI: 10.1006/jmre.2002.2570). The resulting, phase-corrected data were Inverse Laplace Transformed into a $T_2$ spectrum using the Matlab non-negative least square constraints function lsqnonneg (Lawson, C. L. and R. J. Hanson, Solving Least Squares Problems, Prentice-Hall, 1974, Chapter 23, p. 161) with boundaries set for $T_2$, requiring $T_2$ to be in the range of 0.01 to 10 seconds and with the regularisation parameter lambda set to 0.2.

For every sample, the data were treated as follows to obtain the FDP: In the $T_2$ distribution curve for a particular sample, the peak corresponding to the water protons of which $T_2$ is averaged by exchange between the bulk water phase and the surface of the defibrillated primary cell wall material was identified. It is believed that the exchange (and resulting averaging) is due to diffusion and chemical exchange between bulk and cellulose surface sites. As can be seen in the spectra in FIGS. 1 and 2, in the present case, the peaks of the bulk water phase were easily distinguished, as they were the peaks with the highest intensity. The peak corresponding to the bulk water phase in the matrix reference sample was similarly identified.

The average $T_2$ value was determined by calculating the intensity-weighted average of the peak.

$R_2$ is defined as the inverse of this average $T_2$, i.e. $R_2=1/T_2$ and is expressed in Hz. The fibre defibrillation parameter FDP for a given sample is calculated as the difference between $R_2$ of the sample and $R_2$ of the matrix reference sample:

FDP=$R_2$(sample)–$R_2$(matrix reference)

Thus, FDP is a measure for the bulk water interaction with the available microfibril surface (K. R. Brownstein, C. E. Tarr, Journal of Magnetic Resonance (1969) Volume 26, Issue 1, April 1977, Pages 17-24).

Examples 4-11

Effect of Defibrillated Plant Cell Wall Material Concentration on Foam Stability Compositions according to the invention were prepared in the presence of surfactant systems SLES/NaLAS (Examples 4-7) or Empigen/Imbentin (Examples 8-11) with increasing levels of defibrillated plant cell wall material and compared with comparative examples without defibrillated plant cell wall material (Comparative Examples B and C).

Preparation of Examples 4-8 and Comparative Example B Comprising SLES/NaLAS

Demineralised water was put in a beaker to which Herbacel AQ type N citrus fibres were added (for water and fibre levels see Table 7), which were subsequently hydrated using an overhead Silverson (type L4RT-A, screen with 1 mm round holes) at 2000 rpm for 20 min. Comparative example B did not contain defibrillated plant cell wall material. SLES, NaLAS, and Nipacide BIT 20 were added sequentially upon mixing until dissolved in the amounts as indicated in Table 7. The resulting dispersion was processed (single pass) using a Microfluidizer™ high pressure homogeniser (Microfluidics—M 110S) at 1200 bar using the 'Z' shear chamber (channel diameter 87 μm).

TABLE 7

Formulations of Comparative Example B and Examples 4-7

| Ingredients | B (wt-%) | 4 (wt-%) | 5 (wt-%) | 6 (wt-%) | 7 (wt-%) |
|---|---|---|---|---|---|
| Demineralised water | 81.75 | 81.00 | 80.75 | 80.50 | 80.25 |
| Herbacel AQ+ type N | 0 | 0.75 | 1.00 | 1.25 | 1.50 |
| SLES (70 wt % in demineralised water) | 8.04 | 8.04 | 8.04 | 8.04 | 8.04 |
| NaLAS (18.5 wt % in demineralised water) | 10.14 | 10.14 | 10.14 | 10.14 | 10.14 |
| Nipacide BIT20 (preservative) | 0.08 | 0.08 | 0.08 | 0.08 | 0.08 |
| Total | 100.00 | 100.00 | 100.00 | 100.00 | 100.00 |

Preparation of Examples 9-11 and Comparative Example C Comprising Empigen/Imbentin Demineralised water was put in a beaker to which Herbacel AQ type N citrus fibres were added (for water and fibre levels see Table 8), which were subsequently hydrated using an overhead Silverson (type L4RT-A, screen with 1 mm round holes) at 2000 rpm for 20 min. Comparative example C did not contain defibrillated plant cell wall material. Empigen® (lauramine oxide), Imbentin (nonionic alkoxilates), and Nipacide BIT 20 were added sequentially upon mixing until dissolved in the amounts as indicated in Table 8. The resulting dispersion was processed (single pass) using a Microfluidizer™ high pressure homogeniser (Microfluidics—M 110S) at 1200 bar using the 'Z' shear chamber (channel diameter 87 μm).

TABLE 8

Formulations of Comparative Example C and Examples 8-11

| Ingredients | C (wt-%) | 8 (wt-%) | 9 (wt-%) | 10 (wt-%) | 11 (wt-%) |
|---|---|---|---|---|---|
| Demineralised water | 87.92 | 87.17 | 86.92 | 86.67 | 86.42 |
| Herbacel AQ+ type N | 0 | 0.75 | 1.00 | 1.25 | 1.50 |
| Empigen OB | 10.00 | 10.00 | 10.00 | 10.00 | 10.00 |
| Imbentin 91-2.5 | 2.00 | 2.00 | 2.00 | 2.00 | 2.00 |
| Nipacide BIT20 | 0.08 | 0.08 | 0.08 | 0.08 | 0.08 |
| Total | 100.00 | 100.00 | 100.00 | 100.00 | 100.00 |

Foam Stability

The formulations of compositions B and 4-8 and C and 9-11 were aerated using an Aerolatte™ electrical whisk. Demi-water (200 grams) and 1 gram of composition were placed in 1 litre polypropylene beaker (diameter bottom 96 mm, height 182 mm, Vitlab), followed by mixing until maximum foam volume was achieved. The foam was allowed to drain until the 200 g of water was visible again, then the foam volume was recorded (t=0 min), and 30 minutes later recorded again to assess foam stability. Table 9 summarises the foam stabilizing effect of the microfibrillated citrus fibre, which has a dose-dependent relationship.

TABLE 9

Effect of increasing amounts of microfibrillated citrus fibres [MCF, wt-%] - in 2 different surfactant systems - on foam stability 30 minutes after foam preparation

| Samples | [MCF] | Foam volume (ml ± sd, n = 2) | | Relative foam volume |
|---|---|---|---|---|
| | | t = 0 min | t = 30 min | |
| B | 0.00 | 375 ± 35 | 235 ± 35 | 0.63 |
| 4 | 0.75 | 400 ± 28 | 310 ± 57 | 0.78 |
| 5 | 1.00 | 450 ± 0 | 350 ± 42 | 0.78 |
| 6 | 1.25 | 470 ± 14 | 340 ± 14 | 0.72 |
| 7 | 1.50 | 450 ± 28 | 300 ± 0 | 0.67 |
| C | 0.00 | 450 ± 14 | 190 ± 42 | 0.42 |
| 8 | 0.75 | 450 ± 28 | 325 ± 35 | 0.72 |
| 9 | 1.00 | 500 ± 28 | 425 ± 35 | 0.85 |
| 10 | 1.25 | 500 ± 28 | 460 ± 14 | 0.92 |
| 11 | 1.50 | 500 ± 14 | 475 ± 35 | 0.95 |

The invention claimed is:

1. A cleaning composition, comprising
   a. water
   b. 0.01 to 70 wt % of one or more detergent surfactants; and
   c. 0.1 to 4 wt % of defibrillated primary cell wall material comprising microfibrils;
   wherein
   the primary cell wall material is sourced from plant parenchymal tissue;
   at least 80 wt % of the microfibrils is smaller than 50 nm in diameter; and wherein the cleaning composition has a composition homogeneity parameter CHP of at least 0.030, wherein the defibrillated primary cell wall material is prepared by providing a source of the primary cell wall material in an aqueous phase, thereby forming an aqueous dispersion comprising between 0.1 and 4 wt % of the primary cell wall material, mixing a surfactant into the aqueous dispersion and treating the aqueous dispersion in a high pressure homogenization step or microfluidisation step at a pressure of 500 and 2000 bar.

2. A cleaning composition according to claim 1, having a composition homogeneity parameter CHP of at least 0.031.

3. The cleaning composition according to claim 1, wherein the composition homogeneity parameter CHP is at least 0.032.

4. The cleaning composition according to claim 1, wherein the composition homogeneity parameter CHP is at least 0.033.

5. The cleaning composition according to claim 1, wherein the composition homogeneity parameter CHP is at least 0.040.

6. The cleaning composition according to claim 1, wherein the composition homogeneity parameter CHP is at least 0.050.

7. The cleaning composition according to claim 1, wherein the defibrillated primary cell wall material has a fibre homogeneity parameter FHP of at least 0.022 or the defibrillated primary cell wall material has a fibre defibrillation parameter FDP of at least 0.10 Hz.

8. A cleaning composition according to claim 1, wherein each of the composition homogeneity parameter, the fibre homogeneity parameter, and the fibre defibrillation parameter represents a measurement of a degree of disentanglement of the microfibrils.

9. A cleaning composition according to claim 1, comprising from 0.2 to 60 wt-% of the one or more surfactants.

10. A cleaning composition according to claim 1, wherein the one or more detergent surfactants are selected from one or more of anionic surfactants, cationic surfactants, non-ionic surfactants, amphoteric surfactants and zwitterionic surfactants.

11. A cleaning composition according to claim 1, comprising from 0.2 to 1.0 wt-% of the defibrillated primary cell wall material.

12. A method for preparing a cleaning composition according to claim 1, wherein the method comprises the steps of:
   i. providing a source of primary cell wall material;
   ii. dispersing the primary cell wall material in an aqueous phase, thereby to form an aqueous dispersion comprising between 0.1 and 4 wt % of the primary cell wall material;
   iii. treating the aqueous dispersion to obtain a dispersion comprising defibrillated primary cell wall material, whereby the treatment includes one or more high shear treatment steps and wherein the treatment is such that the fibre defibrillation parameter FDP of the defibrillated primary cell wall material is at least 0.10 Hz or a fibre homogeneity parameter FHP of the defibrillated primary cell wall material is at least 0.22;

wherein constituents of the cleaning composition other than the surfactant are independently mixed into the aqueous phase before step ii, between steps ii and iii, or after step iii.

* * * * *